United States Patent Office 2,978,507
Patented Apr. 4, 1961

2,978,507
POLYNITROAMINES

Milton B. Frankel, Pasadena, and Karl Klager, Monrovia, Calif., assignors to Aerojet-General Corporation, Azusa, Calif., a corporation of Ohio No Drawing. Filed Apr. 13, 1956, Ser. No. 578,153

20 Claims. (Cl. 260—583)

This invention relates to new compositions of matter and a method for their preparation. In particular, this invention relates to secondary polynitro amines having the general formula:

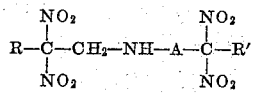

wherein A is an alkylene radical and R and R' are nitro or alkyl radicals, at least one R being alkyl.

This application is a continuation-in-part of our copending United States patent application Serial No. 419,615, filed March 29, 1954, now abandoned.

Due to their high oxygen content and stability, these compounds find valuable use as explosives. They may also be incorporated in resinous propellant fuels where they serve as oxygen donors or modifiers.

The compounds of this invention are prepared by condensing β-geminal polynitro alcohols with ammonia or polynitro amines. Optimum results were obtained when the condensation was conducted at a pH below about 8 and preferably from about 4 to about 8. As a matter of convenience, the ammonia or amine is usually produced in situ.

The unsymmetrical secondary amines are prepared by condensing the alcohol with a polynitro amine, as illustrated by the reaction scheme set forth below:

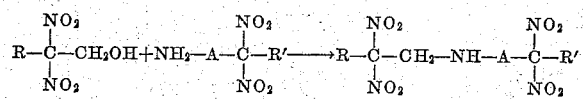

wherein A is an alkylene radical and R and R' are alkyl or nitro radicals, at least one R being alkyl. Usually the primary amine is employed as a salt of a strong mineral acid yielding the free amine in situ in the presence of a hydroxide or weak organic acid salt of an alkali or alkaline earth metal. Alternatively, the amine may be introduced as a salt of a weak organic acid which readily hydrolyzes producing the free amine.

Generally as a matter of convenience the symmetrical amines are prepared by condensing the alcohol with ammonia as illustrated by the general reaction scheme set forth below:

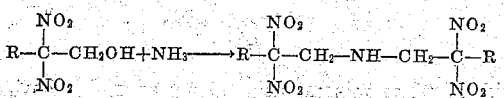

wherein R is an alkyl radical. An ammonium salt of a weak organic acid is usually employed as the ammonia donor.

The alcohols used as starting materials for this invention are obtained by condensing labile hydrogen containing nitroalkanes with formaldehyde. The amines are prepared by reacting a strong mineral acid with the corresponding isocyanates, prepared by the reaction of sodium azide and the corresponding acyl halides, as disclosed in assignee's copending application No. 405,515, filed January 21, 1954, now U.S. Patent No. 2,923,726.

To more clearly illustrate this invention, the following examples are presented. It is to be understood, however, that these examples are presented merely as a means of illustration and are not intended to limit the scope of the invention in any way.

EXAMPLE I

*Preparation of N-3,3-dinitrobutyl-N-2,2,2-trinitroethyl amine*

To a solution of 30 gm. (0.15 mole) of 3,3-dinitrobutyl amine hydrochloride, 27 gm. (0.15 mole) of trinitroethanol and 100 ml. of water, was added 132 ml. of 1.36 N sodium hydroxide solution (0.15 mole). An oil was formed which was extracted with methylene chloride and subsequently concentrated to yield an amber liquid (71.7%). The explosive values for this compound are:
Lead block value 138 TNT=100.
Ballistic mortar value 144 TNT=100.

EXAMPLE II

*Preparation of N-2,2-dinitropropyl-N-3,3,3-trinitropropyl amine*

2,2-dinitropropanol and 3,3,3-trinitropropyl amine were condensed in the manner described in Example I to produce an amber oil in quantitative yield. The explosive values for this compound are:
Lead block value 138 TNT=100.
Ballistic mortar value 144 TNT=100.

EXAMPLE III

*Preparation of bis(2,2-dinitropropyl) amine*

A solution of 30 gm. (0.39 mole) of ammonium acetate in 50 ml. of water was added to 30 gm. (0.020 mole) of 2,2-dinitropropanol. The reaction was warmed on a steambath for 20 minutes. On cooling 25.4 gm. (90.4%) of a cream-colored solid separated which upon recrystallization from methanol and water exhibited a M.P. of 62–63° C. and an impact stability greater than 100 cm./2 kg.

EXAMPLE IV

*Preparation of bis(2,2-dinitroamyl) amine*

A quantity of 11.6 gm. of 2,2-dinitropentanol was warmed on a steambath for 20 minutes with a solution of 11.6 gm. of ammonium acetate in 100 ml. of water. On cooling a solid precipitated. Recrystallization of the solid from ethanol yielded white rods, M.P. 100–100.5° C. The elemental analysis of the product is as follows:
Calculated for $C_{10}H_{19}N_5O_8$: percent C, 35.61; percent H, 5.68; percent N, 20.77. Found: percent C, 35.78; percent H, 5.58; percent N, 19.75.

EXAMPLE V

*Preparation of bis(2,2-dinitrobutyl) amine*

Bis(2,2-dinitrobutyl) amine was prepared from 2,2-dinitrobutanol by following the procedure described in Example IV and recrystallizing the product from isopropyl alcohol in a yield of 99%, M.P. 66–67° C. The elemental analysis of the product is as follows:
Calculated for $C_8H_{15}N_5O_8$: percent C, 31.07; percent H, 4.89; percent N, 22.65. Found: percent C, 31.06; percent H, 4.98; percent N, 21.73.

We have also found that amines such as 5,5,5-trinitropentyl amine, 4,4-dinitropentyl amine, 3,3-dinitro-4-methylpentyl amine, etc., readily condense with β-geminal dinitro alcohols such as 2,2-dinitro-3-methyl butanol, 2,2-dinitro-3,3-dimethyl butanol, etc., to yield their corresponding polynitroamines, namely; N-5,5,5-trinitropentyl- N-2,2-dinitro-3-methylbutyl amine, N-5,5,5-trinitropentyl-N-2,2-dinitro-3,3-dimethylbutyl amine, N-4,4-dinitropentyl-N-2,2-dinitro-3-methylbutyl amine, N-4,4-dinitropentyl-N-2,2-dinitro-3,3-dimethylbutyl amine, N-3,3-dinitro-4-methylpentyl-N-2,2-dinitro-3-methylbutyl amine, and N-3,3-dinitro-4-methylpentyl-N-2,2-dinitro-3,3-dimethylbutyl amine.

It is apparent that any polynitro amine of this series can be prepared by merely selecting an appropriate amine and condensing it with a β-geminal dinitro alcohol, in accordance with the teachings of this invention.

The nitro compounds of this invention are useful as high explosives and can be used in any conventional explosive missile, projectile, rocket, or the like, as the main explosive charge. An example of such a missile is disclosed in United States Patent No. 2,470,162, issued May 17, 1949. One way of using the high explosives of this invention in a device such as that disclosed in United States Patent No. 2,470,162 is to pack the crystalline explosive in powder form into the warhead of the missile. Alternatively, the crystals can be first pelletized and then packed. A charge thus prepared is sufficiently insensitive to withstand the shock entailed in the ejection of a shell from a gun barrel or from a rocket launching tube under the pressure developed from ignition of a propellant charge, and can be caused to explode on operation of an impact- or time fuse-mechanism firing a detonating explosive such as lead azide or mercury fulminate.

The liquid explosive compositions of this invention are preferably absorbed in cotton, sawdust or similar materials for use as explosives. This technique is the same as is employed in the manufacture of commercial dynamites, gun cotton and the like. The absorbed material presents considerably less hazard in this form and can still be used in the same manner as the solid or crystalline explosives of this invention.

We claim:

1. As compositions of matter, the secondary polynitro amines having the general formula:

wherein A is a lower alkylene radical and R and R' are radicals selected from a group consisting of nitro and lower alkyl radicals, at least one R being alkyl.

2. As compositions of matter, the secondary polynitro amines having the general formula:

wherein A is a lower alkylene radical and R and R' are lower alkyl radicals.

3. As compositions of matter, the secondary polynitro amines having the general formula:

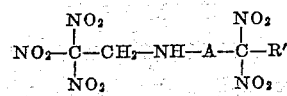

wherein A is a lower alkylene radical and R' is a lower alkyl radical.

4. As compositions of matter, the secondary polynitro amines having the general formula:

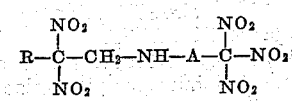

wherein A is a lower alkylene radical and R is a lower alkyl radical.

5. As a composition of matter, N-2,2,2-trinitroethyl-N-3-3-dinitrobutyl amine having the structural formula:

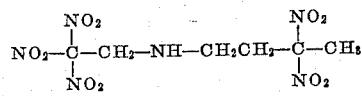

6. As a composition of matter, N-2,2-dinitropropyl-N-3,3,3-trinitropropyl amine having the structural formula:

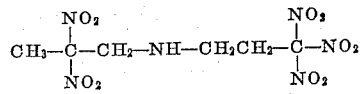

7. As a new composition of matter, bis(2,2-dinitropropyl) amine having the structural formula:

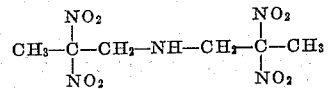

8. As a composition of matter, bis(2,2-dinitrobutyl) amine having the structural formula:

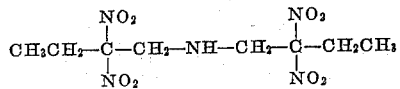

9. As a composition of matter, bis(2,2-dinitropentyl) amine having the structural formula:

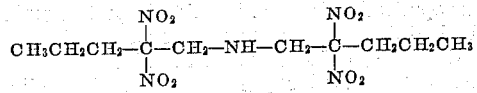

10. The method of preparing secondary polynitro amines having the general formula:

wherein A is a lower alkylene radical and R and R' are radicals selected from a group consisting of lower alkyl and nitro radicals, at least one R being lower alkyl; which comprises condensing a β-geminal polynitro aliphatic alcohol with a compound selected from the group consisting of ammonia and aliphatic polynitro amines having the general formula:

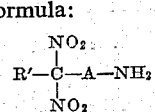

wherein A and R' are as defined above.

11. The method of claim 10 wherein the reaction is conducted at a pH below about 8.

12. The method of preparing secondary polynitro amines having the general formula:

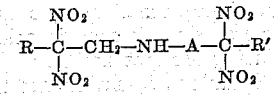

which comprises condensing an alcohol having the general formula:

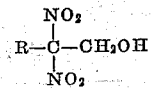

with a strong mineral acid salt of an amine having the general formula:

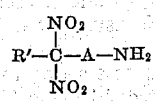

wherein A is a lower alkylene radical and R and R' are radicals selected from a group consisting of lower alkyl and nitro radicals, at least one R being lower alkyl; in the presence of a base selected from the group consisting of the hydroxides of alkali and alkaline earth metals.

13. The method of preparing secondary polynitro amines having the general formula:

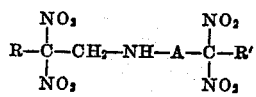

which comprises condensing an alcohol having the general formula:

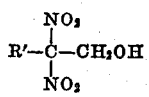

with a strong mineral acid salt of an amine having the general formula:

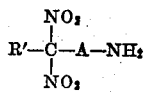

wherein A is a lower alkylene radical, R is a nitro radical and R' is a lower alkyl radical; in the presence of a base selected from the group consisting of the hydroxides of alkali and alkaline earth metals.

14. The method of preparing secondary polynitro amines having the general formula:

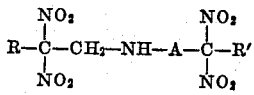

which comprises condensing an alcohol having the general formula:

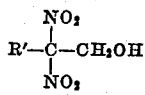

with a strong mineral acid salt of an amine having the general formula:

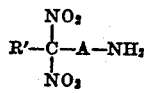

wherein A is a lower alkylene radical, R is a lower alkyl radical and R' is a nitro radical; in the presence of a base selected from the group consisting of the hydroxides of alkali and alkaline earth metals.

15. The method of preparing symmetrical aliphatic polynitro amines having the general formula:

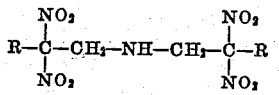

which comprises condensing β-geminal dinitro alcohols having the general formula:

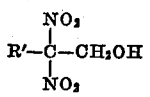

wherein R is a lower alkyl radical, with ammonia.

16. The method of preparing N-2,2,2-trinitroethyl-N-3,3-dinitrobutyl amine which comprises condensing 2,2,2-trinitroethanol with 3,3-dinitrobutyl amine hydrochloride in the presence of sodium hydroxide.

17. The method of preparing N-3,3-dinitropropyl-N-3,3,3-trinitropropyl amine which comprises condensing 2,2-dinitropropanol with 3,3,3-trinitropropyl amine hydrochloride in the presence of sodium hydroxide.

18. The method of preparing bis(2,2-dinitropropyl) amine which comprises condensing 2,2-dinitropropanol in the presence of ammonia.

19. The method of preparing bis(2,2-dinitrobutyl) amine which comprises condensing 2,2-dinitrobutanol in the presence of ammonia.

20. The method of preparing bis(2,2-dinitropentyl) amine which comprises condensing 2,2-dinitropentanol in the presence of ammonia.

References Cited in the file of this patent

UNITED STATES PATENTS 2,731,460    Schenck et al. _____ Jan. 17, 1956

OTHER REFERENCES

Wertheim: Textbook of Organic Chemistry, The Blakiston Co., 2nd ed., page 308.